United States Patent
Leonardson et al.

(10) Patent No.: US 6,257,060 B1
(45) Date of Patent: Jul. 10, 2001

(54) COMBINED ENHANCED SHOCK LOAD CAPABILITY AND STRESS ISOLATION STRUCTURE FOR AN IMPROVED PERFORMANCE SILICON MICRO-MACHINED ACCELEROMETER

(75) Inventors: Ronald B. Leonardson, Redmond; Graeme A. Blake, Bellevue, both of WA (US)

(73) Assignee: AlliedSignal Inc., Morristown, NJ (US)

(*) Notice: Subject to any disclaimer, the term of this patent is extended or adjusted under 35 U.S.C. 154(b) by 0 days.

(21) Appl. No.: 09/432,306

(22) Filed: Nov. 2, 1999

Related U.S. Application Data

(60) Provisional application No. 60/140,526, filed on Jun. 22, 1999.

(51) Int. Cl.⁷ ........................ G01P 15/10
(52) U.S. Cl. .............................. 73/514.29
(58) Field of Search .............. 73/514.29, 862.59, 73/514.36, 514.37, 702, 704, 514.32, 514.15, 514.16, 514.35; 361/280

(56) References Cited

U.S. PATENT DOCUMENTS

| | | | |
|---|---|---|---|
| 5,005,413 | * 4/1991 | Novack et al. | 73/514.29 |
| 5,392,650 | * 2/1995 | O'Brien et al. | 73/514.29 |
| 5,948,981 | * 9/1999 | Woodruff | 73/514.29 |
| 5,948,982 | * 9/1999 | Woodruff et al. | 73/514.29 |
| 5,996,411 | * 12/1999 | Leonardson et al. | 73/514.29 |

* cited by examiner

Primary Examiner—Helen Kwok

(57) ABSTRACT

The present invention provides an acceleration sensor and an accelerometer having isolation structure formed using a bulk straight wall deep reactive ion etch process, whereby external stress sources are isolated from active accelerometer components.

24 Claims, 4 Drawing Sheets

COMBINED ENHANCED SHOCK LOAD CAPABILITY AND STRESS ISOLATION STRUCTURE FOR AN IMPROVED PERFORMANCE SILICON MICRO-MACHINED ACCELEROMETER

This application claims the benefit of U.S. Provisional Application Ser. No. 60/140,526, filed in the names of Ronal B. Leonardson and Graeme A. Blake on Jun. 22, 1999, the complete disclosure of which is incorporated herein by reference.

FIELD OF THE INVENTION

The present invention relates to accelerometers, and in particular to structures for mounting the same, whereby external stress sources are isolated from active accelerometer components.

BACKGROUND OF THE INVENTION

Accelerometers generally measure acceleration forces applied to a body. Accelerometers are typically mounted directly onto a surface of the accelerated body. Such direct mounting ensures the immediate detection of even subtle forces exerted on the body. The directly mounted accelerometer is, however, also exposed to various extraneous shock, vibration and thermal stresses experienced by the accelerated body. The accelerometer measures the forces induced by such external stresses in combination with the applied acceleration forces and renders confused and inaccurate acceleration measurements. Generally, isolation mechanisms between the accelerometer and the accelerated body, typically integral to the accelerometer housing, protect the accelerometer from forces induced by stresses within the accelerated body.

While stresses experienced by the accelerated body are isolated from the accelerometer, sensitive accelerometers can suffer from error sources caused by subtle forces induced by stresses internal to the accelerometer but external to the acceleration sensing mechanism. In monolithic micro-machined accelerometers having vibrating beam force detectors suspended between a movable proof mass and an accelerometer frame, such forces are caused by, for example, bonding stresses between a silicon cover plate and the sensor frame or other assembly stresses. Other such forces are caused by, for example, thermal stresses resulting from a mismatch of thermal expansion coefficients between materials within the sensor. External thermal stresses may be induced by the typical mechanical coupling of the sensor frame to the silicon cover plate and by the mechanical coupling of the silicon cover plate to a ceramic or metal mounting plate. Because the cover and mounting plates are typically fabricated from different materials, they usually have substantially different coefficients of thermal expansion. When heated, the mismatch in thermal expansion coefficients generally causes undesirable stresses which induce distortion and strain in the sensor frame.

Bias performance and stability of monolithic silicon based accelerometers is based on proof mass sizing, commonly referred to as pendulousity, and on the degree of stress isolation in the mechanical die stack. Monolithic micro-machined vibrating beam accelerometers are typically targeted for small size which limits the proof mass size and generally requires special care in providing isolation from external stresses. Historically, the accelerometer frame is suspended from a second outer frame by flexures that permit the accelerometer frame to move relative to the outer frame, as shown and described in allowed U.S. patent application Ser. No. 08/735,299. Such isolation structure designs as have been possible using a potassium hydroxide (KOH) etching solution in a bulk process to cost effectively fabricate monolithic micro-machined vibrating beam accelerometers effectively minimize the distortion of the accelerometer frame and decrease the effects of the thermal coefficient mismatch. However, the orientation of the natural etch planes in silicon at 54.7 degrees from horizontal requires relatively large amounts of physical space when using a KOH etching solution, thus limiting both the pendulousity, i.e., possible proof mass size, and the possible isolation structure designs and requiring major compromises and trade-offs in proof mass sizing and isolation structure design in very small applications.

Furthermore, although some monolithic micro-machined vibrating beam accelerometers have included isolation structure in the one cover plate by which the sensor mechanism is mounted to the ceramic or metal mounting plate, to date, no monolithic micro-machined vibrating beam accelerometers have included isolation structure in the both cover plates for reducing or eliminating residual stresses caused by die bowing. Additionally, to date, none has provided a large centralized mounting area surrounded with a self-caging structure for surviving high shock loads.

SUMMARY OF THE INVENTION

The present invention overcomes the accelerometer and proof mass sizing constraints of the prior art by providing an acceleration sensor formed of a monocrystalline silicon substrate having essentially parallel opposing surfaces using a bulk straight wall deep reaction ion etching (DRIE) process. The acceleration sensor includes an outer frame member with an acceleration sensing mechanism disposed within the outer frame member and suspended therefrom by multiple flexures for de-coupling the sensitive elements of the acceleration sensing mechanism from stresses in the outer frame member. The flexures are formed with essentially parallel opposing walls extending between the opposing surfaces of the substrate and essentially perpendicular thereto. The opposing walls of the flexures are disposed in a self-caging relationship to each of the outer frame and the accelerometer frame member to protect the acceleration sensing mechanism from external shocks, especially lateral shocks input perpendicular to the accelerometer's input axis.

According to one aspect of the invention, the acceleration sensing mechanism is generally enclosed between two cover plates, bottom cover plate and a top cover plate, each also formed of monocrystalline silicon substrates having essentially parallel opposing surfaces using a bulk straight wall deep reaction ion etching (DRIE) process. Each of the top and bottom plates is formed with an outer frame portion suspended from an inner cover portion corresponding to the acceleration sensing mechanism. An accelerometer die stack is formed by mounting the acceleration sensor between the top and bottom cover plates. The outer frame portions of the top and bottom cover plates support, and are preferably adhesively attached to, the outer frame member surrounding the acceleration sensing mechanism, whereby the inner cover portions of the top and bottom cover plates serve, among other functions, to protect the sensitive components of the acceleration sensing mechanism from external shocks, especially shocks input along the accelerometer's input axis.

According to another aspect of the invention, the flexures suspending the outer frame portions of the top and bottom cover plates from the respective inner cover portions are formed in a self-caging relationship with each of the outer frame portions and the inner cover portions. The flexures are formed by very narrow overlapping slots cut using a bulk DRIE process and formed with essentially straight walls extending between and perpendicular to the opposing surfaces of the cover plate substrate. The walls of the resulting flexures and the opposing walls of the outer frame members and inner cover portions are similarly essentially straight and perpendicular to the opposing surfaces of the substrate. The flexures de-couple the outer frame portions from shocks and stresses experienced by the inner cover portions. The narrow slots and essentially parallel opposing relationship between the surfaces of the flexures and the surfaces of the outer frame portions and the inner cover portions restrict the lateral motions of the outer frame portions relative to the inner cover portions, such that a self-caging relationship is developed. Thus, when the accelerometers die stack is mounted to a mounting plate by an adhesive bond between the inner cover portion of either the top or bottom cover plate, the flexures in the cover plates further de-couple the acceleration sensor from externally induced stresses and protect the mechanism from later shock loads. Such de-coupling further allows the bond between the inner cover portion and the mounting plate to involve essentially all of the area of the inner cover portion.

According to yet another aspect of the invention, the top and bottom cover plates are formed essentially identically such that the symmetry between causes residual bowing stresses in the cover plates to be eliminated by common mode effects.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the FIGURES, like numerals indicate like elements.

Figure 1:
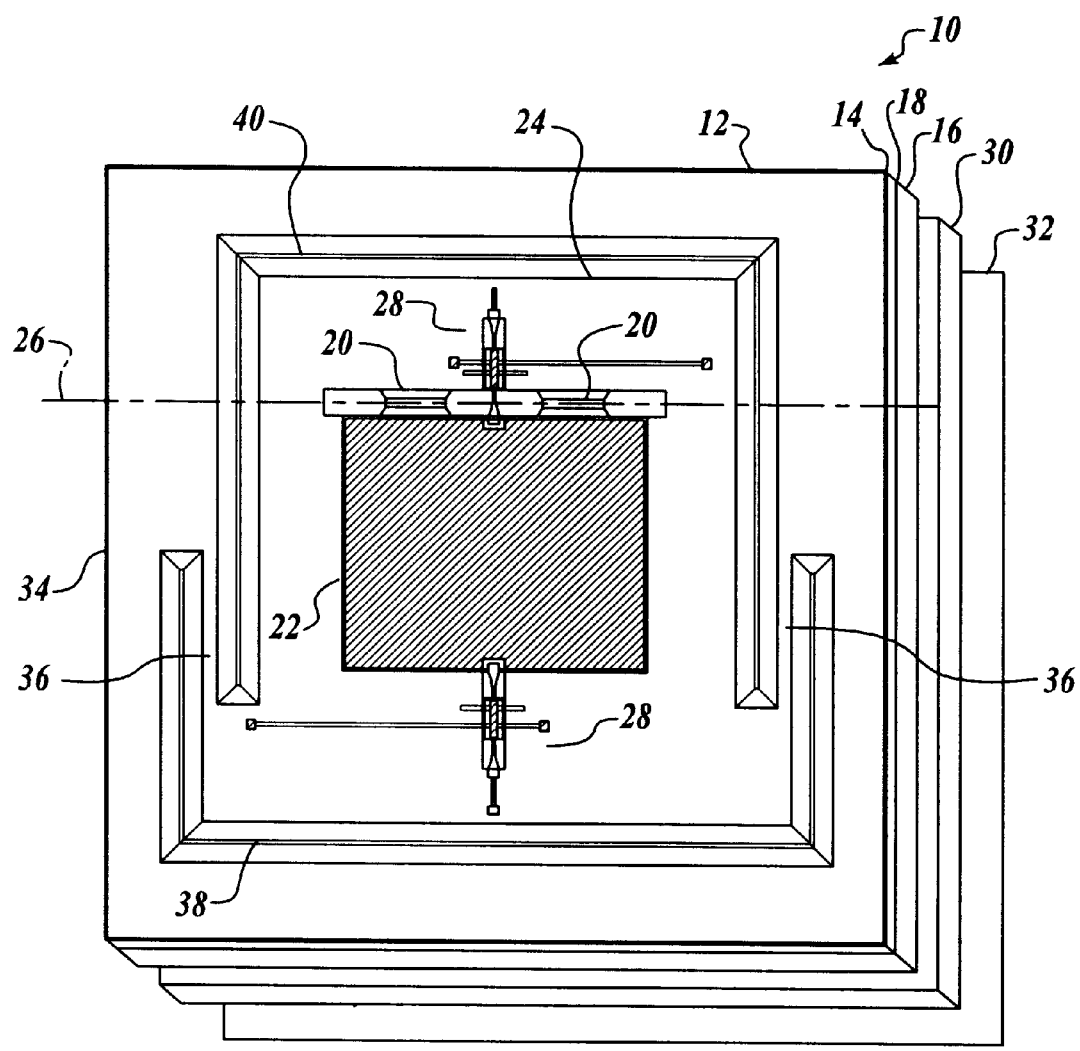
FIG. 1 is an illustration of the isolation structure of the prior art.

FIG. 1 illustrates an accelerometer of the prior art. In FIG. 1, accelerometer 10 is a miniature structure fabricated from a substrate 12 of semiconductor material by conventional micromachining techniques. Substrate 12 is formed of a monocrystalline silicon material. Silicon substrate 12 includes an upper silicon or active layer 14 electrically isolated from an underlying substrate 34 by an insulating layer 36 or an insulating layer is applied to active layer 14, as shown and described in above incorporated U.S. patent application Ser. No. 08/735,299. Insulating layer 36 is preferably a thin layer, e.g., about 0.1 to 10.0 micrometers, of oxide, such as silicon oxide. Silicon substrate 12 is usually formed by oxidizing active layer 14 and underlying substrate 34, and adhering the two layers together. A portion of active layer 14 is removed to bring layer 14 to the desired thickness. Silicon oxide layer 36 retains its insulating properties over a wide temperature range to ensure effective mechanical resonator performance at high operating temperatures on the order of 100 degrees Celsius. In addition, insulating layer 36 inhibits undesirable etching of active layer 14 during etching.

Accelerometer 10 includes one or more flexures 20 pliantly suspending a proof mass 22 from a frame 24 for movement of the proof mass 22 along an input axis normal to proof mass 22. Flexures 20 are preferably etched near or at the center of the underlying substrate 34, i.e., substantially centered between the opposing upper and lower surfaces of underlying substrate 34. Preferably, flexure 20 is formed by anistropically etching the flexures in a suitable etchant, such as potassium hydroxide (KOH). Flexures 20 define a hinge axis 26 about which proof mass 22 moves in response to an applied force, such as the acceleration of the accelerated body, for example, a vehicle, aircraft or other moving body having the accelerometer 10 mounted thereon. Accelerometer 10 includes a pair of mechanical resonators 28 formed from active silicon layer 14 and coupled to proof mass 22 and to frame 24 for measuring forces applied to proof mass 22. An oscillator circuit (not shown) drives mechanical resonators 28 at their resonance frequency. In response to an applied force, proof mass 22 rotates about hinge axis 26, causing axial forces, either compressive or tensile, to be applied to mechanical resonators 28. The axial forces change the frequency of vibration of mechanical resonators 28 and the magnitude of this change serves as a measure of the applied force.

External stresses and strains may be induced in the sensitive acceleration sensing mechanism by, for example, the typical mechanical coupling of accelerometer frame 24 to a silicon cover plate 30, which, in turn, is typically connected to a ceramic or metal mounting plate 32. Since the mounting and cover plates are fabricated from different materials, they will usually have substantially different coefficients of thermal expansion when cooled or heated. This mismatch in thermal coefficients may cause undesirable stresses and strains at the interface of the inner and cover plates, causing a slight distortion of accelerometer frame 24. Other stresses and strains induced in the sensitive acceleration sensing mechanism include, for example, external sources of shock and vibration experienced by the accelerated body and accelerometer 10. Many methods of isolating frame 24 from such undesirable stresses and strains are known to those of ordinary skill in the relevant arts. For example, suspending accelerometer frame 24 from a second outer frame 34 by flexures 36 formed by overlapping slots 38 and 40 through substrate 12, whereby accelerometer frame 24 is able to move relative to the outer frame 34, as shown and described in above incorporated allowed U.S. patent application Ser. No. 08/735,299. Such isolation minimizes the distortion of accelerometer frame 24 and thereby decreases the effects of thermal mismatching on mechanical resonators 28.

Figure 2A:
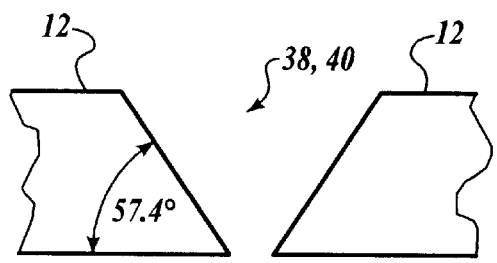
FIG. 2 illustrates the difference between the physical area consumed using the prior art bulk process potassium hydroxide (KOH) etching method and the straight wall deep reaction ion etching (DRIE) method of the present invention.
Figure 2B:
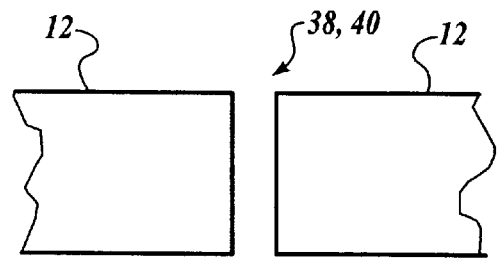

FIGS. 2A and 2B illustrate the contrast between the natural etch planes in silicon at 54.7 degrees from horizontal using a potassium hydroxide (KOH) etching solution in a bulk process and straight wall deep reaction ion etching (DRIE) that provides forming of monolithic silicon structures having very narrow slots with near vertical walls. FIG. 2A shows the natural etch planes in monocrystalline silicon substrate 12 resulting from KOH etching. The angular material removal requires physical space because the etched slot 38, 40 grows in width as it progresses through the thickness of the material. FIG. 2B shows the nearly vertical etched slot formed in monocrystalline silicon substrate 12 by the DRIE process. The nearly vertical DRIE etching process having a slope of less than 1 degree from vertical, in contrast to the 54.7 degrees resulting from KOH etching, results in relatively narrow etch slots. For example, the DRIE process forms a slot 38', 40' of less than 50 micrometers in a standard 525 micrometer thick substrate 12 in contrast to the relatively wide trough formed by KOH etching, as shown in FIG. 2A. Thus, forming slots in monocrystalline silicon substrate 12 using the DRIE process requires much less physical space than the prior art KOH etching process and allows novel compact isolation structures, while maximizing pendulousity.

The present invention is a monolithic micro-machined vibrating beam accelerometer device and method for manufacturing such a device having minimal accelerometer frame distortion and maximum pendulousity in very small applications, including de-coupling the accelerometer mechanism die from the mounting and bowing stresses in the bottom and top cover plates, isolation structure in the accelerometer mechanism die for reducing or eliminating externally induced stresses, self-caging isolation structure in the accelerometer mechanism die and in both cover plates for reducing susceptibility to external shock loads, and a large centralized mounting area surrounded with a self-caging structure in the cover plates for surviving high shock loads.

Figure 3:
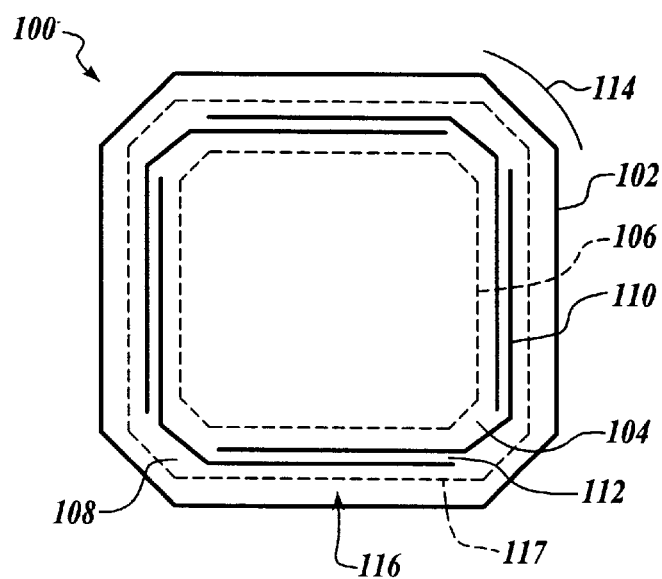
FIG. 3 illustrates acceleration sensor of the present invention, including the flexures whereby the sensitive elements are de-coupled from stresses and shocks in the outer frame member.

FIG. 3 illustrates one embodiment of the present invention using the DRIE process to form an accelerometer in a monocrystalline silicon substrate, the accelerometer having maximum pendulousity in a compact structure impossible using the prior art KOH etching process or similar bulk silicon micro-matching process. In FIG. 3, the accelerometer mechanism die 100 portion of an accelerometer is formed in monocrystalline silicon substrate 102. Accelerometer mechanism die 100 includes a sensitive acceleration sensing mechanism having an accelerometer frame 104 formed in substrate 102. Accelerometer frame 104 is formed with typical active components 106 disclosed in the prior art, including a proof mass suspended from accelerometer frame 104 by one or more flexures and one or more mechanical resonators formed from an active silicon layer portion of substrate 102 and coupled between the proof mass and accelerometer frame 104 for measuring forces applied to the proof mass along the input axis. According to the invention, accelerometer frame 104 is isolated from an outer frame 108 by multiple narrow, nearly vertical slots 110 formed using the DRIE process. Slots 110 are preferably formed having filleted or circular ends that reduce stress concentrations, although other effective shapes for reducing stress concentrations at the terminus of a slot are likewise contemplated.

Preferably, slots 110 are closely spaced and overlap to a significant degree to form multiple thin, highly pliant flexures 112 through essentially the full thickness of substrate 102. Flexures 112 suspend accelerometer frame 104, and components 106 formed therein, from outer frame 108. The sides of flexures 112 extending between the essentially parallel top and bottom surfaces of substrate 102 are formed using the DRIE process having essentially parallel sides that are essentially perpendicular to the surfaces of substrate 102. Thus, the physical size of accelerometer frame 104 is maximized within a minimum footprint substrate 102. As a result, the size of the proof mass, i.e., the accelerometer pendulousity, can be maximized without increasing the overall size of the accelerometer. As contrasted in FIG. 2, slots 110 formed by the DRIE process are far narrower, on the order of 50 micrometers or less, than possible using any prior art bulk etching processes and have nearly parallel opposing walls in contrast to the wide troughs created by prior art bulk etching processes. Thus, slots 110 formed by the DRIE process provide a compact isolation structure that effectively de-couples accelerometer mechanism die 100 from stresses induced in outer frame 108. The nearly parallel, narrowly spaced walls of isolation slots 110 provide self-caging of accelerometer frame 104 within outer frame 108 that reduces shock susceptibility, particularly susceptibility to lateral shocks, without increasing overall accelerometer size. According to one embodiment of the invention, slots 110 are formed having maximum length and overlap within the dimensions of substrate 102 such that suspension flexures 112 are formed with a maximum length. Flexures 112 having a maximum length provide additional isolation that improves bias performance, again without increasing overall accelerometer size.

According to one embodiment of the invention, in an accelerometer mechanism die formed having a square or rectangular shape, the corner portions of the substrate are removed using the DRIE process to allow larger mechanisms to better fit within small mechanical packages. For example, as shown in FIG. 3, the corners of outer frame 108 formed by square substrate 102 are removed to form an octagonally shaped accelerometer mechanism die 100 to fit in a circular housing, represented by curved line segment 114. In such an embodiment, bond area 116 and each of slots 110 are preferably angled to match the contour of octagonal substrate 102. Slots 110 are preferably formed having curved or filleted ends that reduce stress concentrations at the angular intersections between slots, although other effective shapes for reducing stress concentrations at the intersections between slots are likewise contemplated.

FIG. 3 also illustrates the bonding area portion 116 of outer frame 108, preferably defined between dashed lines 117 and the outer periphery of outer frame 108, for attachment to one of top and bottom cover plates. A corresponding bonding area 116 (not shown) is provided on the opposite surface of outer frame 108 for attachment to the other of top and bottom cover plates.

Figure 4:
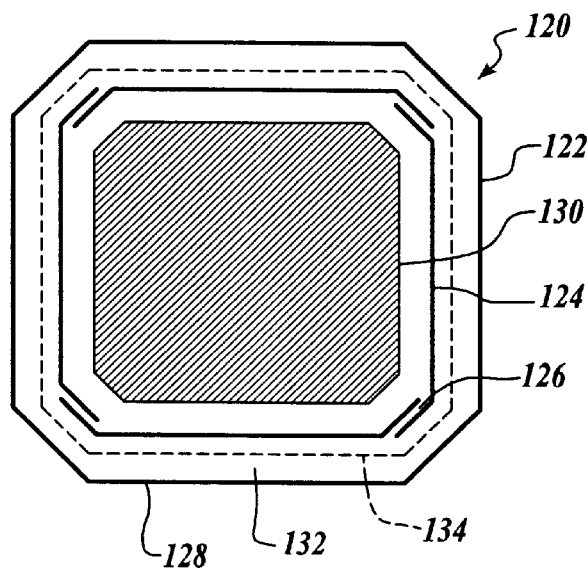
FIG. 4 illustrates the bottom cover plate of the present invention, including the relatively large mounting area and the flexures whereby the outer frame portion is de-coupled from mounting stresses and shocks, and further illustrates the self-caging relationship between the flexures and each of the inner cover or mounting portion and the outer frame portion.

FIG. 4 illustrates the accelerometer bottom cover plate having integral isolation slots that provide in-plane self-caging for improved shock survivability and a large central mounting area. In FIG. 4, the bottom cover plate 120 portion of an accelerometer is formed in another monocrystalline silicon substrate 122, preferably having a similar thickness to that of substrate 102 forming accelerometer mechanism die 100. Using identical substrate materials throughout the accelerometer assembly tends to limit the thermal stresses resulting from thermal coefficient mismatch between joined materials. Bottom cover plate 120 is formed by the DRIE process with multiple very narrow slots 124 having closely spaced nearly parallel sides not possible in prior art devices. Pairs of overlapping slots 124 form multiple flexures 126 that suspend an outer frame portion 128 from a relatively large central mounting area 130. Outer frame portion 128 includes a bond area 132, preferably defined between dashed lines 134 and the outer periphery of outer frame 128. Bond area 132 provides an area isolated from central mounting area 130 where accelerometer mechanism die 100 is mounted, preferably using an in a glass frit adhesive. Bottom cover plate 120 is preferably mounted to a metal or ceramic mounting plate, shown in FIG. 5, using an adhesive disposed in central mounting area 130.

Central area 130 forms a large bond area that contrasts significantly with the essentially point mount typically used in prior art devices to limit the effects of mounting stresses and thermal coefficient mismatch between monocrystalline silicon cover plate 120 and a typically metal mounting plate. Typical prior art devices mount the accelerometer bottom cover plate to the metal mounting plate using a small central dot of adhesive that forms an essentially point mount, whereby the accelerometer is isolated from mounting stresses and other external stress sources. In contrast, according to the invention, multiple flexures 126 isolate accelerometer mechanism die 100 from stresses of adhesively mounting bottom cover plate 120 to the mounting plate. The isolation of accelerometer mechanism die 100 provided by slots 124 permits use of essentially all of the relatively large physical size of mounting area 130 in forming a maximum adhesive bond interface with the mounting plate, thus significantly improving shock survivability over prior art devices. Slots 124 have nearly parallel opposing walls far more closely spaced than possible using prior art bulk etching processes. For example, walls of slots 124 have a less than 1 degree slope and are again less than 50 micrometers wide in a cover plate 120 having a thickness essentially the same as substrate 102. Thus, the closely spaced, nearly parallel opposing walls of slots 124 form an effective lateral, or in-plane, self-caging feature in a compact isolation structure to protect accelerometer mechanism die 100 from shocks experienced in bond area 130 of bottom cover plate 120. The length of the overlap between pairs of slots 124 and the separation between adjacent slots 124, i.e., the length and width, respectively, of flexures 126, determine the compliance and shock load capacity of the isolation structure. For example, according to one configuration, four flexures 126 suspend mounting area 130 of bottom cover plate 120 from outer frame 128, each of flexures 126 are configured 215 micrometer wide by 1602 micrometer long in a 525 micrometer thick substrate 122.

According to one embodiment of the invention, in an accelerometer having the corner portions of the mechanism die substrate removed to form an octagonal shape, the corners of substrate 122 forming bottom cover plate 120 are also removed using the DRIE process to provide a matching contour. Each of slots 124 and the bond area of outer frame 128 are preferably angled to provide a similarly matching contour.

Figure 5:
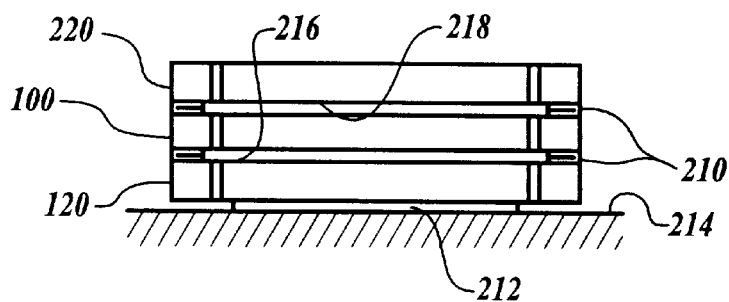
FIG. 5 illustrates the accelerometer die stack of the invention, including the interface between the accelerometer mechanism die and each of the top and bottom cover plates and the relatively large accelerometer mounting area provided by the invention.

FIG. 5 illustrates one embodiment of the accelerometer die stack 200 of the invention. Die stack 200 includes accelerometer mechanism die 100 bonded to bottom cover plate 120 using, for example, a glass frit bond 210 between bond areas 116 and 128, shown in FIG. 3 and FIG. 4, respectively. As shown, the large size of bond area 130, shown in FIG. 4, provides a significantly larger bond pad 212 between bottom cover plate 120 and the accelerometer mounting plate 214 than the point mount typical of prior art devices. Isolation structure provided by flexures 112 in substrate 102 and flexures 126 in bottom cover plate 120, shown in FIG. 3 and FIG. 4, respectively, significantly reduce the effects on bias performance of mounting stresses and other external stress sources over that possible in prior art devices by providing multiple isolation structures between accelerometer mechanism die 100 and such stress sources. Thus, both absolute bias and bias stability are improved over that of prior art devices. Die stack 200 also includes top cover plate 220 bonded to accelerometer mechanism die 100 opposite bottom cover plate 120 again using, for example, a glass frit bond 210 between bond areas 116 and 224, shown in FIG. 3 and FIG. 6, respectively.

An inner cover portion 216 is formed on the surface of substrate 122 opposite central portion 130 and in an area of substrate 122 corresponding to central area 130 (shown in FIG. 4). Inner cover portion 136 of bottom cover plate 120 forms a cover for accelerometer mechanism die 100, and in particular for the proof mass portion thereof. As is disclosed in the prior art and known to those of ordinary skill in the relevant art, inner cover portion 216 is spaced a predetermined distance from accelerometer mechanism die 100 and restricts the motion of the proof mass along the input axis, which is generally perpendicular to the surfaces of substrate 102, thereby protecting the resonators from damage. Similarly, an inner cover portion 218 is formed on the surface of substrate 222 opposite central plate portion 234 and in an area of substrate 222 corresponding to central plate portion 234 (shown in FIG. 6). Inner cover portion 218 of top cover plate 220 forms a second cover for accelerometer mechanism die 100, and in particular for the proof mass portion thereof, opposite inner cover portion 216. Inner cover portion 218 is spaced a predetermined distance from accelerometer mechanism die 100 and further restricts the motion of the proof mass along the input axis in a direction opposite to substrate 102, thereby further protecting the resonators from damage.

Figure 6:
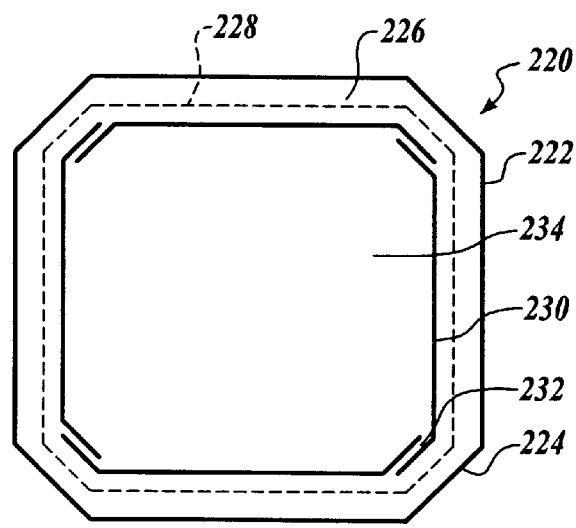
FIG. 6 illustrates the top cover plate of the present invention, including the relative identity to the bottom cover plate of FIG. 4, and further illustrates the self-caging relationship between the flexures and each of the inner cover portion and the outer frame portion.

FIG. 6 illustrates top cover plate 220 formed of a monocrystalline silicon substrate 222, preferably having a thickness essentially the same as that of substrate 102 used for accelerometer mechanism 100 and substrate 122 used for bottom cover plate 120. Top cover plate 220 includes an outer frame portion 224 that includes a bond area 226, preferably defined between dashed lines 228 and the outer periphery of outer frame portion 224. Preferably, bond area 226 of outer frame portion 224 generally corresponds to bond area 116 of accelerometer mechanism die 100, shown in FIG. 3. Top cover plate 220 is attached to accelerometer die mechanism 100, preferably using an adhesive in a glass frit carrier disposed between bond area 226 of outer frame portion 224 and corresponding bond area 116 of accelerometer mechanism die 100.

Top cover plate 220 is formed by the DRIE process with multiple very narrow slots 230 having closely spaced nearly parallel sides not possible in prior art devices. Pairs of overlapping slots 230 form multiple flexures 232 that suspend and isolate a large central plate portion 234 from outer frame 224. Bond area portion 226 of outer frame 224 thus provides an area for mounting accelerometer mechanism die 100 that is isolated from central mounting area 130 by multiple flexures 232. Outer frame portion 224 and central plate portion 234 are essentially identical to corresponding central area 130 and outer frame portion 128 of bottom cover plate 120, respectively. Bond area 226 of outer frame portion 224 is essentially identical to corresponding bond area 132 of outer frame portion 128 of bottom cover plate 120. Thus, top cover plate 220 is essentially identical to bottom cover plate 120, such that the accelerometer die stack 200, shown in FIG. 5, is essentially symmetrical about accelerometer mechanism die 100 and common mode effects tend to reduce or eliminate the bias effects of residual wafer bowing in either bottom cover plate 120 or top cover plate 220.

According to an above described embodiment of the invention, the outer comers of outer frame 224 are also removed using the DRIE process to provide substrate 222 with a contour matching that of accelerometer mechanism die 100 and bottom cover plate 120. Each of slots 230 and the bond area of outer frame 224 are preferably angled to provide a similarly matching contour. Thus, the resulting accelerometer allow larger mechanisms to better fit within small mechanical packages.

Alternative Embodiments

Figure 7:
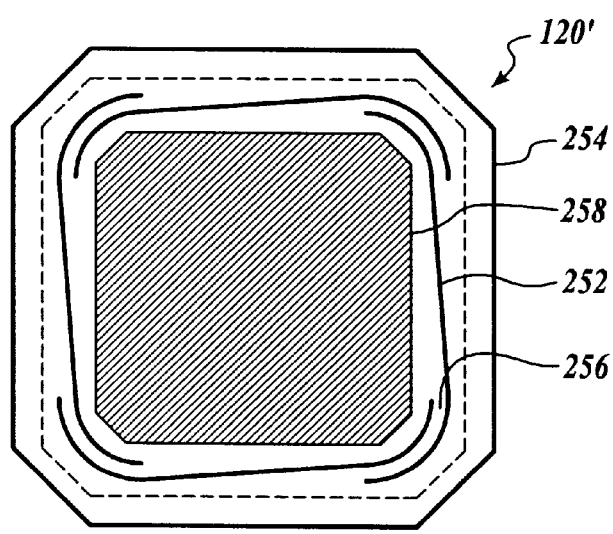
FIG. 7 illustrates one alternative embodiment of the invention, wherein the slots forming the isolations structure are curved for reducing or eliminating stress concentrations.

FIG. 7 illustrates an alternative embodiment of the bottom cover plate 120' of the invention having multiple curved isolation slots 252 formed in a monocrystalline silicon substrate 254 using the DRIE process. Such curved structure exemplifies the flexibility of compact isolation structure design not possible using the KOH etching process or similar bulk silicon micro-matching process. Curved isolation slots 252 formed in substrate 254 are preferably closely spaced and overlap thereby forming curved flexures 256 isolating the central adhesive bond area 258 whereby the accelerometer die stack is attached to a mounting plate. Preferably, curved portions of isolation slots 252 are essentially concentric, such that curved flexures 256 are essentially constant in cross-section. However, a preference for curved flexures 256 having constant cross-section is not intended to limit the invention. Curved isolation slots 252 provide a self-caging isolation structure with more flexibility and less stress concentrations than isolation slots 110, shown in FIG. 4. Such curved isolation structure is equally applicable to accelerometer mechanism 100 and top cover plate 220.

Figure 8:
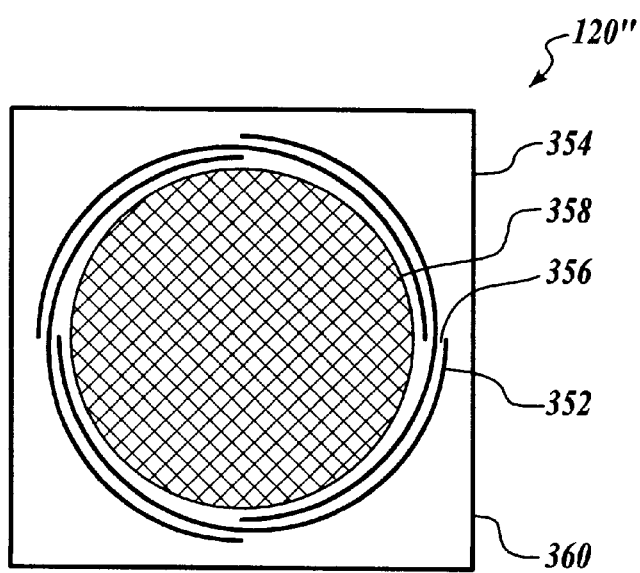
FIG. 8 illustrates another alternative embodiment of the invention having a curved isolation structure cut in a spiral pattern with tapered flexures that provide greater flexibility for the self-caging aspect of the invention.

FIG. 8 illustrates another alternative embodiment of the bottom cover plate 120" of the invention having multiple continuously curved isolation slots 352 formed in a monocrystalline silicon substrate 354 using the DRIE process. Substrate 354 shown with corner portions intact in contrast to earlier FIGURES. Curved isolation slots 352 formed in substrate 354 are preferably closely spaced and overlap thereby forming flexures 356 isolating the central adhesive bond area 358 whereby accelerometer die stack 200 (shown in FIG. 5) is attached to a mounting plate. Curved isolation slots 352 are formed in a spiral rather than concentric such that flexures 356 formed thereby taper from outer frame 360 toward central bond area 358, whereby greater flexibility is provided for improved self-caging. Alternatively, curved isolation slots 352 are formed in concentric rings thereby forming curved flexures 356 having an essentially constant cross-section. Such continuously curved isolation structure is equally applicable to accelerometer mechanism 100 and top cover plate 220.

While the preferred embodiment of the invention has been illustrated and described, it will be appreciated that various changes can be made therein without departing from the spirit and scope of the invention.

What is claimed is:

1. An acceleration sensor comprising:

an outer frame member formed of a monocrystalline silicon substrate having essentially parallel opposing surfaces;

an acceleration sensing mechanism disposed within said outer frame member; and a plurality of flexures suspending said acceleration sensing mechanism from said outer frame member, said flexures having essentially parallel opposing walls extending between said opposing surfaces of said substrate, and wherein said opposing walls of said flexures are disposed in a self-caging relationship to each of said outer frame member and said acceleration sensing mechanism.

2. The acceleration sensor recited in claim 1, wherein:

said outer frame member includes inner walls extending between said opposing surfaces of said substrate and formed essentially perpendicular thereto;

said acceleration sensing mechanism includes outer walls extending between said opposing surfaces of said substrate and formed essentially perpendicular thereto; and ones of said opposing walls of said flexures are disposed essentially parallel to and spaced away from respective ones of said inner walls of said outer frame member and said outer walls of said acceleration sensing mechanism.

3. The acceleration sensor recited in claim 2, wherein:

a first of said opposing walls of said flexures is spaced away from said inner walls of said outer frame member by 50 micrometers or less; and a second of said opposing walls of said flexures is spaced away from said outer walls of said acceleration sensing mechanism by 50 micrometers or less.

4. The acceleration sensor recited in claim 3, wherein:

said inner walls of said outer frame member extending between said opposing surfaces of said substrate are formed perpendicularly thereto within one degree; and said outer walls of said acceleration sensing mechanism extending between said opposing surfaces of said substrate are formed perpendicularly thereto within one degree.

5. The acceleration sensor recited in claim 1, further comprising:

a bottom cover plate;

a top cover plate; and first and second ones of said opposing surfaces of said outer frame member attached to respective ones of said bottom cover plate and said top cover plate.

6. The acceleration sensor recited in claim 5, wherein:

said bottom cover plate is formed of a monocrystalline silicon substrate and further comprises an outer frame portion suspended from a central mounting portion by a plurality of flexures; and said first one of said opposing surfaces of said outer frame member having said acceleration sensing mechanism suspended therefrom is attached to said outer frame portion of said bottom cover plate.

7. The acceleration sensor recited in claim 6, wherein said flexures suspending said outer frame portion of said bottom cover plate from said central mounting portion are disposed in a self-caging relationship to each of said outer frame portion and said central mounting portion relative to a force generally perpendicular to opposing surfaces of said substrate.

8. The acceleration sensor recited in claim 6, wherein:

said top cover plate is formed of a monocrystalline silicon substrate and further comprises a plurality of flexures suspending a central plate portion from an outer frame portion; and said second one of said opposing surfaces of said outer frame member having said acceleration sensing mechanism suspended therefrom is attached to said outer frame portion of said top cover plate.

9. The acceleration sensor recited in claim 8, further comprising an adhesive attaching said outer frame member having said acceleration sensing mechanism suspended therefrom to said each of said top cover plate and said bottom cover plate.

10. A monolithic micro-machined accelerometer having improved shock survivability and external stress de-coupling characteristics, the accelerometer comprising:

an accelerometer mechanism die formed of a first monocrystalline silicon substrate having essentially parallel opposing surfaces, said mechanism die comprising an integral outer frame member, an integral acceleration sensing mechanism disposed within said outer frame member, and a plurality of integral flexures pliantly suspending said acceleration sensing mechanism from said outer frame member, said flexures having essentially parallel opposing surfaces extending between and perpendicular to said opposing surfaces of said substrate, and wherein said opposing surfaces of said flexures are disposed in a self-caging relationship to each of said outer frame and said acceleration sensing mechanism;

a top cover plate formed of a second monocrystalline silicon substrate, said top cover plate including a peripheral bond area adhesively bonded to a first surface of said outer frame member; and a bottom cover plate formed of a third monocrystalline silicon substrate, said bottom cover plate including a peripheral bond area adhesively bonded to a second surface of said outer frame member opposite said top cover plate.

11. The accelerometer recited in claim 10, wherein said bottom cover plate further comprises an integral outer frame member suspended in a self-caging relationship from an integral inner cover portion formed of said third substrate.

12. The accelerometer recited in claim 11, wherein said self-caging relationship between said outer frame member and said inner cover portion of bottom cover plate is developed by a plurality of flexures connected to and disposed between said outer frame member and said inner cover portion, a first surface of said each of said flexures in close proximity to said outer frame member and a second surface of each of said flexures in close proximity to said inner cover portion.

13. The accelerometer recited in claim 12, wherein said top cover plate further comprises an integral outer frame member suspended in a self-caging relationship from an integral inner cover portion formed of said third substrate, said self-caging relationship developed by a plurality of flexures connected to and disposed between said top cover plate outer frame member and said top cover plate inner cover portion, a first surface of each of said top cover plate flexures in close proximity to said top cover plate outer frame member and a second surface of each of said top cover plate flexures in close proximity to said top cover plate inner cover portion.

14. The accelerometer recited in claim 13, wherein said plurality of integral flexures pliantly suspending said acceleration sensing mechanism from said outer frame member are formed by a deep reaction ion etching process.

15. The accelerometer recited in claim 13, wherein said acceleration sensing mechanism further comprises:

an accelerometer frame member;

a proof mass suspended from said accelerometer frame member by one or more flexures; and one or more mechanical resonators extending between said accelerometer frame member and said proof mass.

16. A method for sensing force, the method comprising:

providing an acceleration sensing mechanism formed in a monocrystalline silicon substrate having essentially parallel opposing surfaces;

isolating said acceleration sensing mechanism in a self-caging relationship from an outer frame member formed in said substrate.

17. The method recited in 16, wherein said isolating further comprises suspending said acceleration sensing mechanism from said outer frame member by one or more flexures formed in said substrate having essentially parallel opposing walls extending between and essentially perpendicularly to said opposing surfaces of said substrate.

18. The method recited in 17, wherein said isolating further comprises forming said flexures in close proximity to opposing surfaces of each of said acceleration sensing mechanism and said outer frame member.

19. The method recited in 18, further comprising attaching one of said opposing surfaces of said outer frame member to a bottom cover plate and attaching a second of said opposing surfaces of said outer frame member to a top cover plate.

20. The method recited in 19, wherein said attaching one of said opposing surfaces of said outer frame member to a bottom cover plate further comprises attaching said surface of said outer frame member to an outer frame portion of said bottom cover plate isolated in a self-caging relationship from an inner cover portion.

21. The method recited in 20, wherein said outer frame portion of said bottom cover plate is isolated from said inner cover portion by one or more flexures formed in said bottom cover plate having essentially parallel opposing walls extending between and essentially perpendicularly to opposing surfaces of said bottom cover plate.

22. The method recited in 20, wherein said attaching second of said opposing surfaces of said outer frame member to a top cover plate further comprises attaching said surface of said outer frame member to an outer frame portion of said top cover plate isolated in a self-caging relationship from an inner cover portion.

23. The method recited in 22, further comprising bonding a surface of said inner cover portion of said bottom cover plate to an accelerometer mounting plate.

24. The method recited in 23, wherein said bonding a surface of said inner cover portion of said bottom cover plate to an accelerometer mounting plate further comprises disposing a bonding adhesive over essentially the entire interface between said inner cover portion of said bottom cover plate and said accelerometer mounting plate.

* * * * *